US012339869B2

(12) United States Patent
Green et al.

(10) Patent No.: US 12,339,869 B2
(45) Date of Patent: Jun. 24, 2025

(54) MIGRATION AND VALIDATION OF DATA FROM TABULAR STRUCTURES TO NON-RELATIONAL DATA STORES

(71) Applicant: Capital One Services, LLC, McLean, VA (US)

(72) Inventors: Jeremy Green, Manassas, VA (US); Jee Won Kang, Reston, VA (US); Christopher Zimmerman, Rochester, NY (US); Brady Murphy, Burke, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/820,970

(22) Filed: Aug. 19, 2022

(65) Prior Publication Data

US 2024/0061857 A1 Feb. 22, 2024

(51) Int. Cl.
*G06F 16/25* (2019.01)
*G06F 16/21* (2019.01)
*G06F 16/22* (2019.01)

(52) U.S. Cl.
CPC ......... *G06F 16/258* (2019.01); *G06F 16/214* (2019.01); *G06F 16/2282* (2019.01)

(58) Field of Classification Search
CPC ... G06F 16/258; G06F 16/2282; G06F 16/214
See application file for complete search history.

(56) References Cited

U.S. PATENT DOCUMENTS

| | | | |
|---|---|---|---|
| 2008/0250434 A1* | 10/2008 | Ho | G06F 9/541 719/329 |
| 2012/0151272 A1* | 6/2012 | Behrendt | G06F 11/203 714/39 |
| 2014/0067867 A1* | 3/2014 | Pattabhi | G06F 16/24542 707/E17.055 |
| 2019/0034491 A1* | 1/2019 | Griffith | G06F 16/258 |
| 2019/0318020 A1* | 10/2019 | Chauhan | G06F 11/0709 |
| 2020/0267160 A1* | 8/2020 | Lees | G06F 16/901 |
| 2021/0271648 A1* | 9/2021 | Arbel | G06F 16/21 |
| 2022/0070244 A1* | 3/2022 | Eftekhari | H04L 9/3239 |

(Continued)

OTHER PUBLICATIONS

Rocha L., et al., "A Framework for Migrating Relational Datasets to NoSQL," Procedia Computer Science, ICCS 2015 International Conference on Computational Science, Dec. 2015, vol. 51, pp. 2593-2602.

(Continued)

*Primary Examiner* — Courtney Harmon
(74) *Attorney, Agent, or Firm* — Harrity & Harrity, LLP (57) ABSTRACT

In some implementations, a data migration device may querying a relational data store for a plurality of metadata items. Accordingly, for each metadata item, the data migration device may transmit, to an application programming interface (API), a request for the metadata item, and receive, from the relational data store via the API, the metadata item. Furthermore, for each metadata item, the data migration device may execute a transformation on the metadata item to generate an adapted metadata item for a non-relational data store and transmit, to the API, a request to store the adapted metadata item in the non-relational data store.

20 Claims, 8 Drawing Sheets

(56) References Cited

U.S. PATENT DOCUMENTS

2022/0293107 A1* 9/2022 Leaman ............... G06F 16/951
2022/0374404 A1* 11/2022 Johnson ................ H03M 7/30

OTHER PUBLICATIONS

Sellami R., et al., ODBAPI: a Unified Rest API for Relational and No SQL Data Stores, The IEEE 3rd International Congress on Big Data 2014, Jun. 2014, pp. 1-9, Retrieved from the Internet [URL:https://www.researchgate.net/profile/Rami-Sellami/publication/265846650_ODBAPI_a_unified_REST_API_for_relational_and_NoSQL_data_stores/links/541dab6d0cf2218008d1d549/ODBAPI-a-unified-REST-API-for-relational-and-NoSQL-data-stores.pdf].

* cited by examiner

MIGRATION AND VALIDATION OF DATA FROM TABULAR STRUCTURES TO NON-RELATIONAL DATA STORES

BACKGROUND

Data may be organized in a relational database (e.g., in tabular data structures). One popular example is structured query language (SQL) databases. Alternatively, data may be organized in a non-relational database (e.g., a key-value store, a document store, or a graph database, among other examples). To contrast with SQL databases, non-relational databases are sometimes referred to as "NoSQL" databases.

SUMMARY

Some implementations described herein relate to a system for migrating and validating data from tabular structures to non-relational data stores. The system may include one or more memories and one or more processors communicatively coupled to the one or more memories. The one or more processors may be configured to transmit, to an application programming interface (API), a request for metadata associated with a tabular data structure. The one or more processors may be configured to receive, from a relational data store via the API, the metadata associated with the tabular data structure. The one or more processors may be configured to execute a transformation on the metadata associated with the tabular data structure to generate adapted metadata for a non-relational data store. The one or more processors may be configured to transmit, to the API, a request to store the adapted metadata in the non-relational data store. The one or more processors may be configured to transmit, to the API, a request for metadata associated with the non-relational data store. The one or more processors may be configured to receive, from the non-relational data store via the API, the metadata associated with the non-relational data store. The one or more processors may be configured to verify the metadata associated with the non-relational data store against the adapted metadata.

Some implementations described herein relate to a method of migrating and validating data from tabular structures to non-relational data stores. The method may include querying a relational data store for a plurality of metadata items. The method may include, for each metadata item, transmitting, to an API, a request for the metadata item. The method may include, for each metadata item, receiving, from the relational data store via the API, the metadata item. The method may include, for each metadata item, executing a transformation on the metadata item to generate an adapted metadata item for a non-relational data store. The method may include, for each metadata item, transmitting, to the API, a request to store the adapted metadata item in the non-relational data store.

Some implementations described herein relate to a non-transitory computer-readable medium that stores a set of instructions for migrating and validating data from tabular structures to non-relational data stores for a device. The set of instructions, when executed by one or more processors of the device, may cause the device to query a relational data store for a plurality of metadata items. The set of instructions, when executed by one or more processors of the device, may cause the device to, for each metadata item, transmit, to an API, a request for the metadata item. The set of instructions, when executed by one or more processors of the device, may cause the device to, for each metadata item, receive, from the relational data store via the API, the metadata item. The set of instructions, when executed by one or more processors of the device, may cause the device to, for each metadata item, execute a transformation on the metadata item to generate an adapted metadata item for a non-relational data store. The set of instructions, when executed by one or more processors of the device, may cause the device to, for each metadata item, transmit, to the API, a request to store the adapted metadata item in the non-relational data store. The set of instructions, when executed by one or more processors of the device, may cause the device to, for each metadata item, transmit, to the API, a request for a metadata item associated with the non-relational data store. The set of instructions, when executed by one or more processors of the device, may cause the device to, for each metadata item, receive, from the non-relational data store via the API, a copy of the metadata item associated with the non-relational data store. The set of instructions, when executed by one or more processors of the device, may cause the device to, for each metadata item, validate the copy of the metadata item associated with the non-relational data store against the adapted metadata item.

DETAILED DESCRIPTION

The following detailed description of example implementations refers to the accompanying drawings. The same reference numbers in different drawings may identify the same or similar elements.

Tabular data structures may be migrated to a non-relational database, such as a document store. This migration generally incurs significant processing resources and power. Additionally, errors in the migration can break application programming interface (API) dependencies.

Some implementations described herein provide for an iterative state machine to perform migration from tabular data structures into a non-relational database. Using the iterative state machine conserves processing resources and power as compared with other types of migration scripts. Additionally, or alternatively, some implementations described herein provide for validating migration from tabular data structures into a non-relational database. Accordingly, API dependencies are verified, which conserves processing resources and power that would otherwise be spent on failed API calls.

FIGS. 1A-1E are diagrams of an example 100 associated with migration and validation of data from tabular structures to non-relational data stores. As shown in FIGS. 1A-1E, example 100 includes a data migrator, a user device, an API provider, a relational database (e.g., implemented at a data store), and a non-relational database (e.g., implemented at a data store). These devices are described in more detail in connection with FIGS. 2 and 3.

Figure 1A:
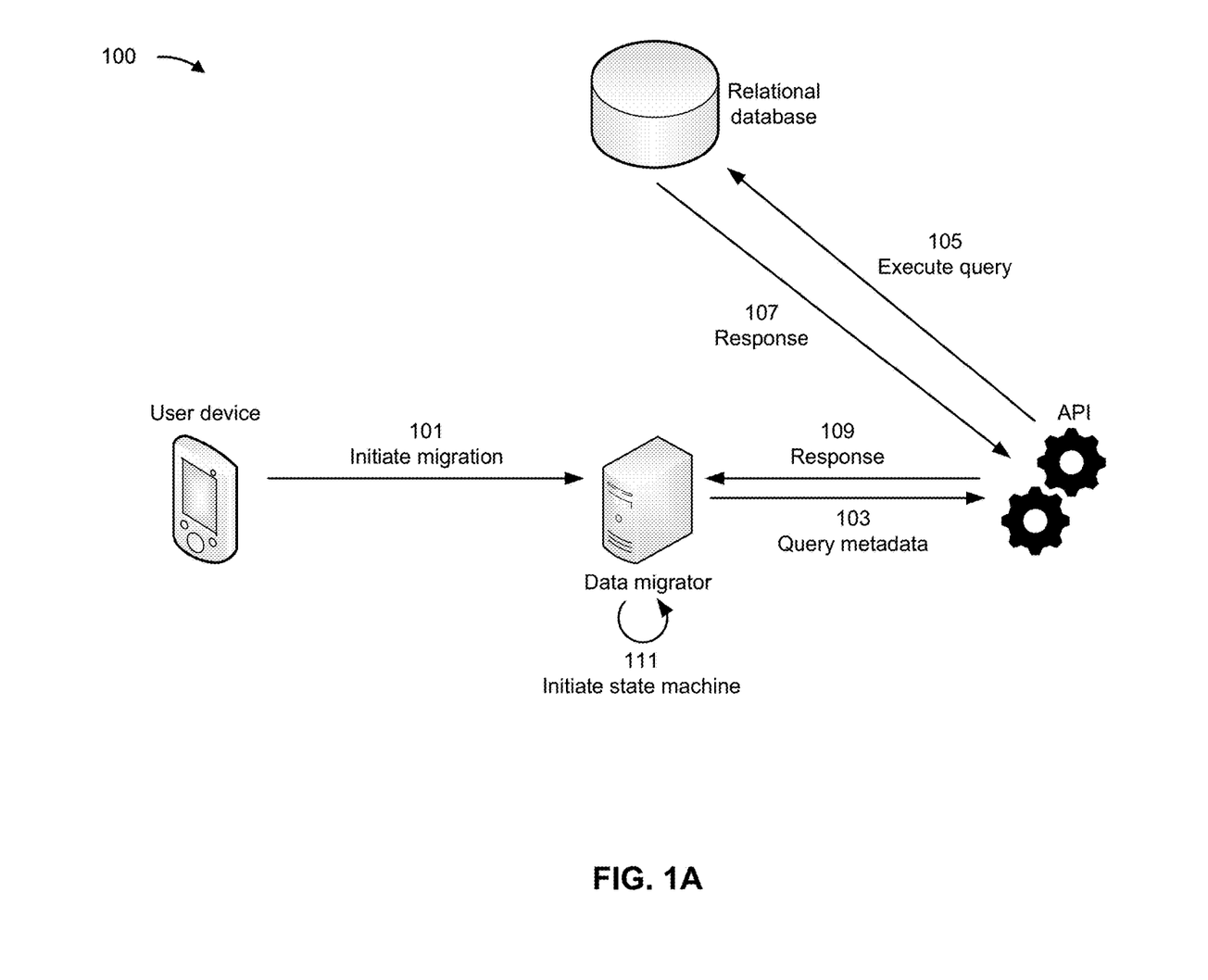
FIGS. 1A-1E are diagrams of an example implementation relating to migration and validation of data from tabular structures to non-relational data stores, in accordance with some embodiments of the present disclosure.

As shown by reference number 101, the user device may transmit, and the data migrator may receive, a command to initiate transfer from the relational database to the non-relational database. As used herein, a relational database may be implemented on a relational data store, and a non-relational database may be implemented on a non-relational data store. In some implementations, the user device may provide credentials (e.g., one or more credentials) to the data migrator with the command or prior to transmitting the command. Accordingly, the data migrator may authenticate the user device before accepting the command.

Based on the command, the data migrator may query the relational database for metadata items (e.g., a plurality of metadata items), as shown by reference number 103. For example, the data migrator may request a list of metadata items associated with a tabular data structure (e.g., one or more tabular data structures) of the relational database.

In some implementations, the API provider may provide access to both the relational database and the non-relational database. Accordingly, the data migrator may generate an override header to include with the query. Thus, the API provider uses the override header to determine that the query is associated with the relational database rather than the non-relational database.

As shown by reference number 105, the API provider may execute the query on the relational database. Accordingly, the API provider may receive a response to the query from the relational database, as shown by reference number 107. For example, the response may include a list of metadata items associated with the tabular data structure. For example, the API provider may receive a plurality of asset identifiers (IDs) based on querying the relational database, and each metadata item received (e.g., as described below in connection with reference number 121) may be associated with a corresponding one of the asset identifiers. As shown by reference number 109, the API provider may transmit, and the data migrator may receive, the list of metadata items (e.g., including the plurality of asset IDs).

As shown by reference number 111, the data migrator may initiate a state machine associated with migration of the relational database to the non-relational database. For example, each metadata item (or each set of metadata items, when the data migrator groups the metadata items into sets) may be associated with a processing thread and thus a corresponding state, separate from other states within the state machine. Each processing thread may proceed with operations as described in connection with FIGS. 1B-1D in order to advance the corresponding state. Processing each metadata item (or each set of metadata items) according to the corresponding state in the state machine increases accuracy of the migration, which reduces processing resources and power that would otherwise be expended on failed queries to the non-relational database. Additionally, processing each metadata item (or each set of metadata items) in a separate processing thread allows for multi-threading, which increases a speed of the migration.

Figure 1B:
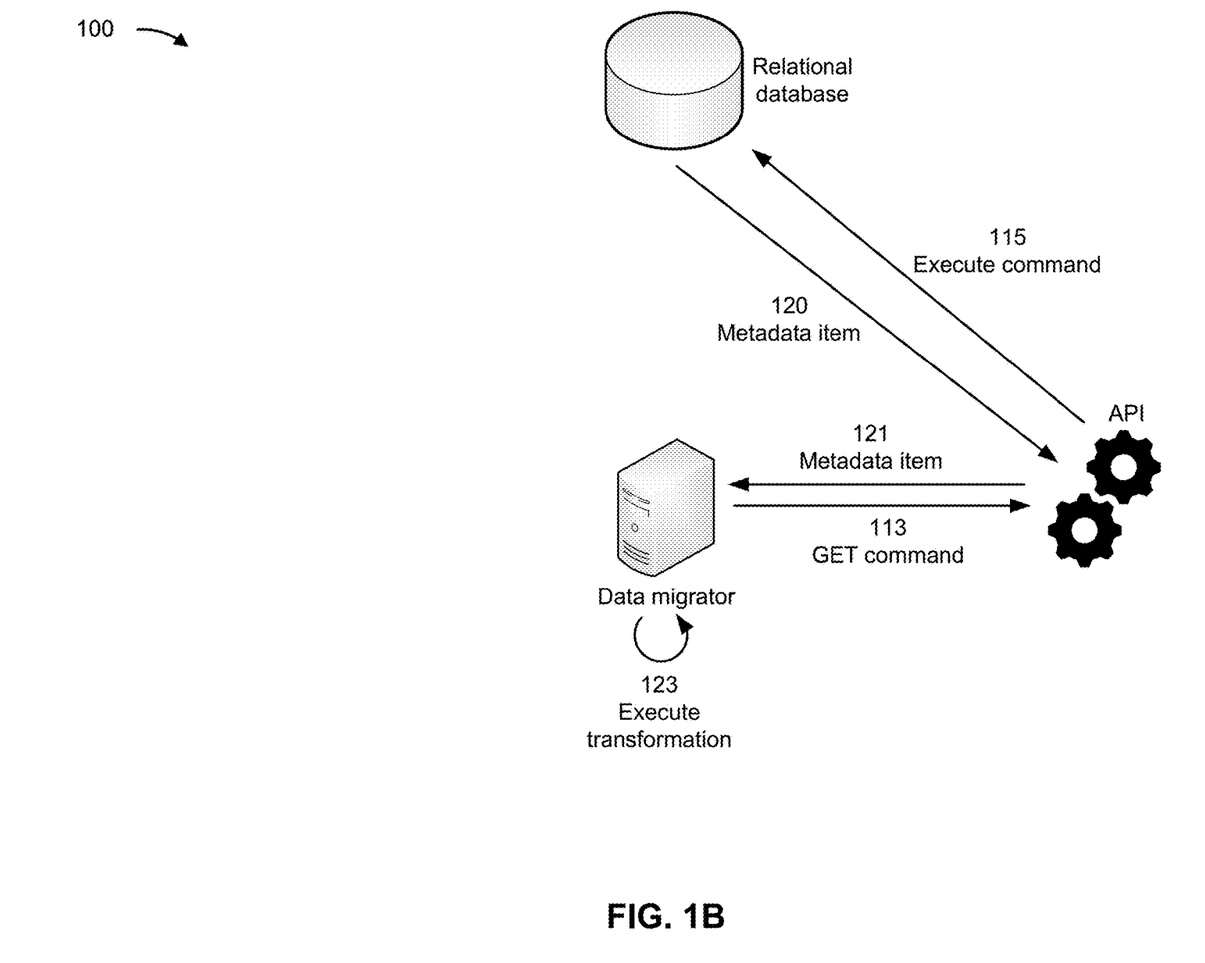

As shown in FIG. 1B and by reference number 113, the data migrator may transmit, to the API provider, a request for metadata associated with the tabular data structure. For example, as described above, the API provider may function as an endpoint for the relational database.

In some implementations, the request may comprise a GET command (e.g., one or more GET commands). The request may include a wildcard or another type of arbitrary input that returns all items from the relational database. In some implementations, the data migrator may receive a list of identifiers (e.g., asset IDs), as described in connection with reference number 109, such that the data migrator uses the list of identifiers to generate requests for the relational database.

In some implementations, the API provider may provide access to both the relational database and the non-relational database. Accordingly, the data migrator may generate an override header to include with the request. Thus, the API provider uses the override header to determine that the request is associated with the relational database rather than the non-relational database.

As shown by reference number 115, the API provider may execute the request (e.g., the GET command) on the relational database. Accordingly, the API provider may receive a response to the request from the relational database, as shown by reference number 120. For example, the response may include metadata items (e.g., one or more metadata items) associated with the tabular data structure. As shown by reference number 121, the API provider may transmit, and the data migrator may receive, the metadata items based on the request.

As shown by reference number 123, the data migrator may execute a transformation on the metadata (e.g., one or more of the metadata items) associated with the tabular data structure to generate adapted metadata (e.g., one or more adapted metadata items) for the non-relational database. For example, the data migrator may rename fields (e.g., one or more fields) in the metadata associated with the tabular data structure to generate adapted fields (e.g., one or more adapted fields) in the adapted metadata. Additionally, or alternatively, the data migrator may convert the metadata associated with the tabular data structure from a first format (e.g., an extensible markup language (XML) format and/or another type of metadata format) to generate the adapted metadata in a second format (e.g., a JavaScript object notation (JSON) format and/or another type of metadata format). Furthermore, the data migrator may advance the state associated with the metadata in the state machine based on the transformation.

Figure 1C:
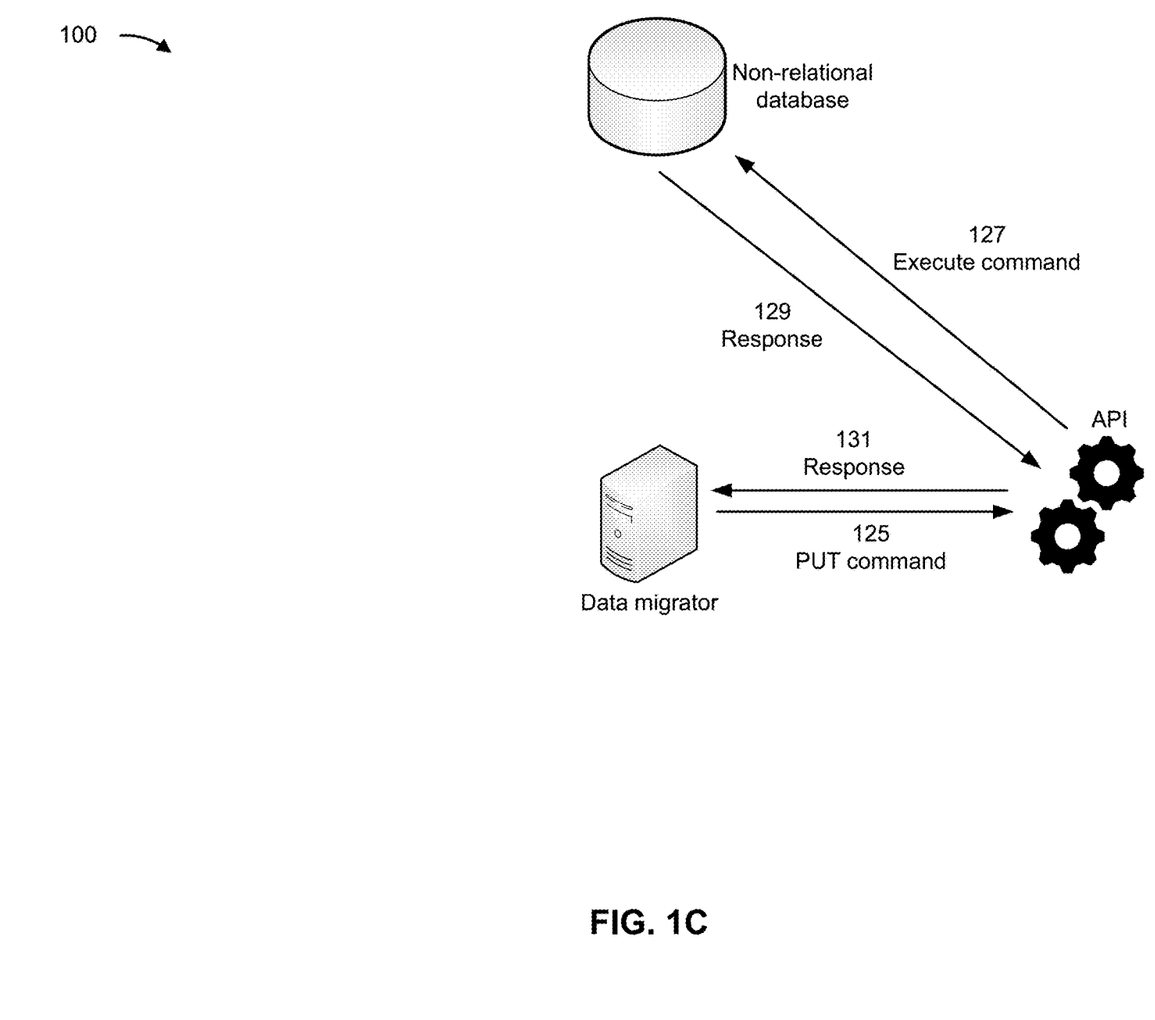

As shown in FIG. 1C and by reference number 125, the data migrator may transmit, to the API provider, a request to store the adapted metadata in the non-relational database. For example, as described above, the API provider may function as an endpoint for the non-relational database.

In some implementations, the request may comprise a PUT command (e.g., one or more PUT commands). In some implementations, the data migrator may receive a list of identifiers (e.g., asset IDs) associated with the metadata items, as described in connection with reference number 109, such that the data migrator uses the list of identifiers to generate requests for corresponding adapted metadata items to be stored in the non-relational database.

In some implementations, the API provider may provide access to both the relational database and the non-relational database. Accordingly, the data migrator may generate an override header to include with the request. Thus, the API provider uses the override header to determine that the request is associated with the non-relational database rather than the relational database.

As shown by reference number 127, the API provider may execute the request (e.g., the PUT command) on the non-relational database. Accordingly, the API provider may receive a response to the request from the non-relational database, as shown by reference number 129. For example, the response may include a confirmation that the adapted metadata was stored. As shown by reference number 131, the API provider may transmit, and the data migrator may receive, a confirmation based on the response. Furthermore, the data migrator may advance the state associated with the metadata in the state machine based on storing the adapted metadata in the non-relational database.

Figure 1D:
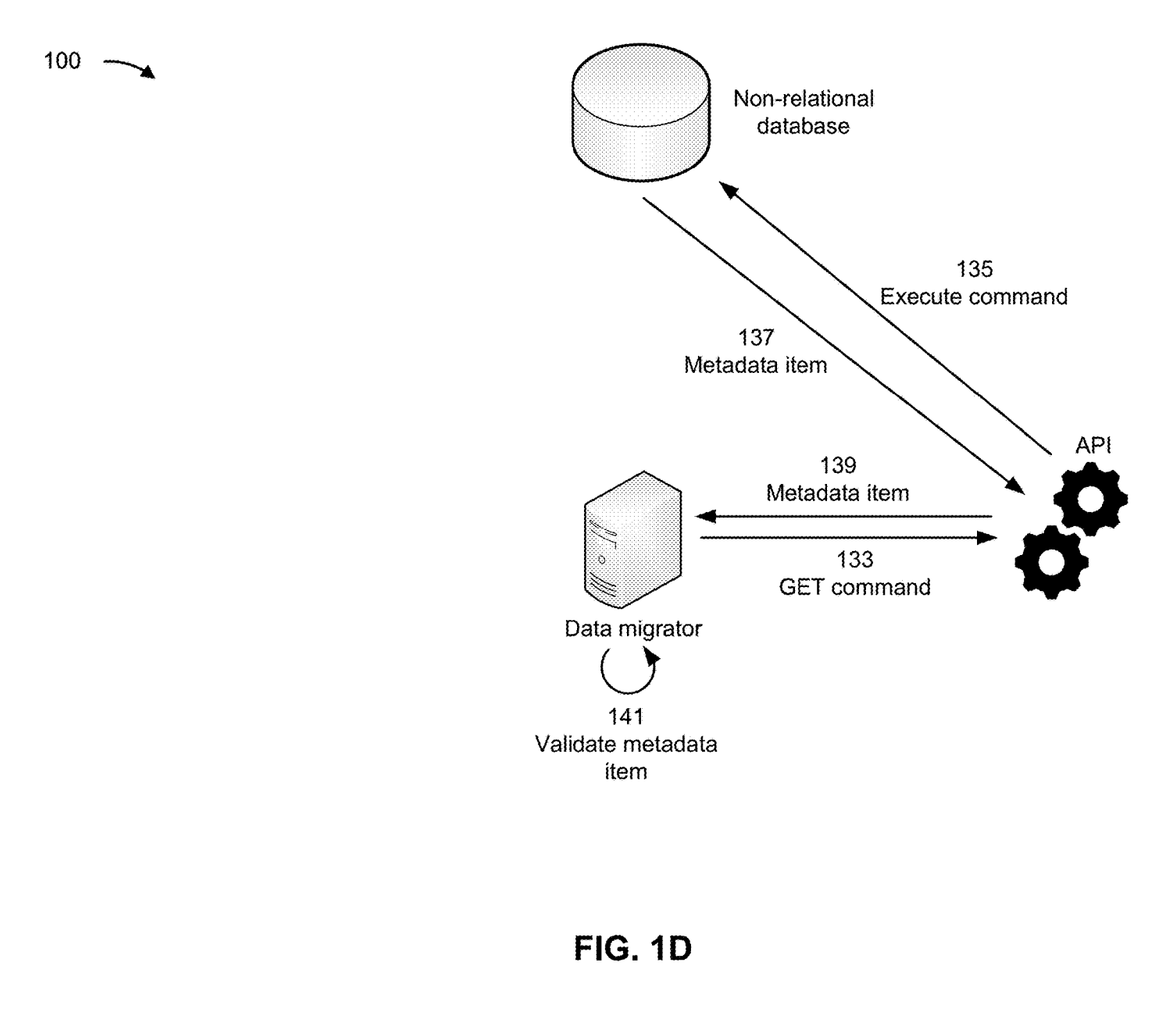

As shown in FIG. 1D and by reference number 133, the data migrator may transmit, to the API provider, a request for metadata associated with the non-relational database. For example, as described above, the API provider may function as an endpoint for the relational database.

In some implementations, the request may comprise a GET command (e.g., one or more GET commands). In some implementations, the data migrator may receive a list of identifiers (e.g., asset IDs), as described in connection with reference number 109, such that the data migrator uses the list of identifiers to generate requests for the non-relational database.

In some implementations, the API provider may provide access to both the relational database and the non-relational database. Accordingly, the data migrator may generate an override header to include with the request. Thus, the API provider uses the override header to determine that the request is associated with the non-relational database rather than the relational database.

As shown by reference number 135, the API provider may execute the request (e.g., the GET command) on the non-relational database. Accordingly, the API provider may receive a response to the request from the non-relational database, as shown by reference number 137. For example, the response may include metadata items (e.g., one or more metadata items) associated with the non-relational database. As shown by reference number 139, the API provider may transmit, and the data migrator may receive, the metadata items based on the request.

Accordingly, as shown by reference number 141, the data migrator may verify the metadata (e.g., the one or more metadata items) associated with the non-relational database against the adapted metadata. For example, the data migrator may verify that data included in each field of the adapted metadata matches data included in a corresponding field of the metadata associated with the non-relational database. The data migrator may correct errors by re-doing the transformation (e.g., as described in connection with reference number 123) and storing the adapted metadata generated during the re-done transformation as described in connection with FIG. 1C.

When no errors are detected, the data migrator may advance the state associated with the metadata in the state machine based on verifying the metadata in the non-relational database. By performing verification before allowing the state to progress, the data migrator increases accuracy of the migration, which reduces processing resources and power that would otherwise be expended on failed calls to the API provider.

Figure 1E:
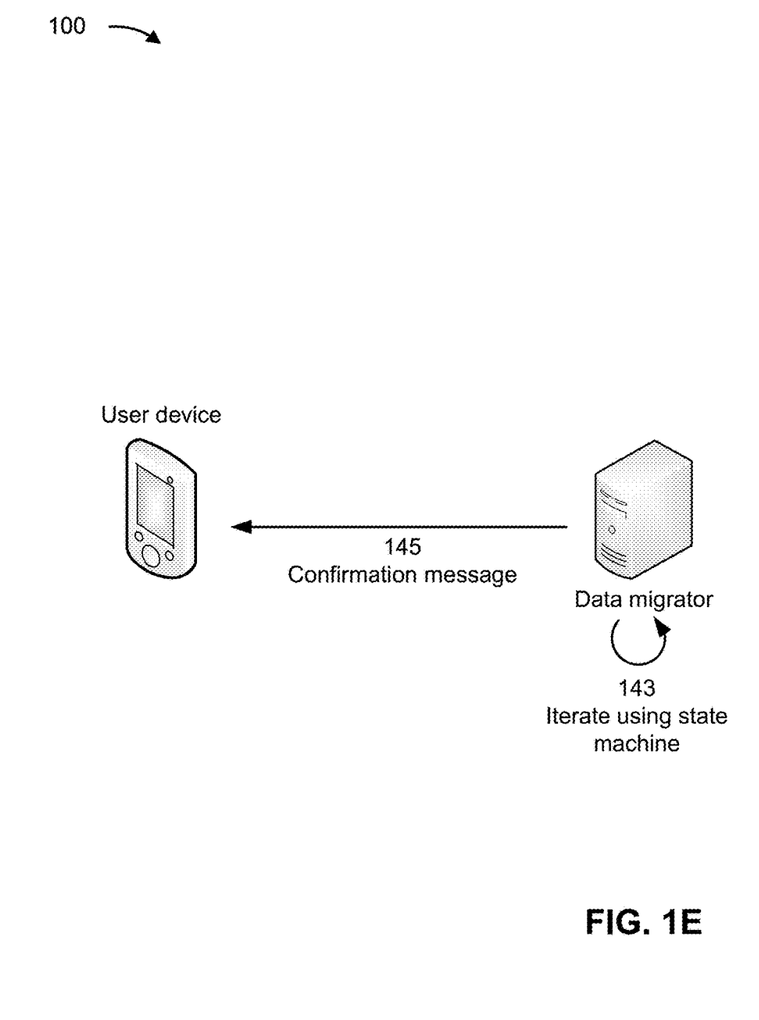

As shown in FIG. 1E and by reference number 143, the data migrator may iterate through the metadata items associated with the tabular data structure using the state machine. For example, the data migrator may be associated with a finite quantity of threads such that some metadata items (or sets of metadata items) are not processed during an initial batch. Accordingly, operations as described in connection with FIGS. 1B-1D may be repeated until every state in the state machine has reached completion (e.g., after validation, as described in connection with reference number 141).

Therefore, when the migration is complete, the data migrator may transmit, and the user device may receive, a confirmation to a user device associated with the relational database, as shown by reference number 145. In some implementations, the data migrator may indicate any errors discovered during validations (e.g., as described in connection with reference number 141) that could not be automatically repaired.

As indicated above, FIGS. 1A-1E are provided as an example. Other examples may differ from what is described with regard to FIGS. 1A-1E.

Figure 2:
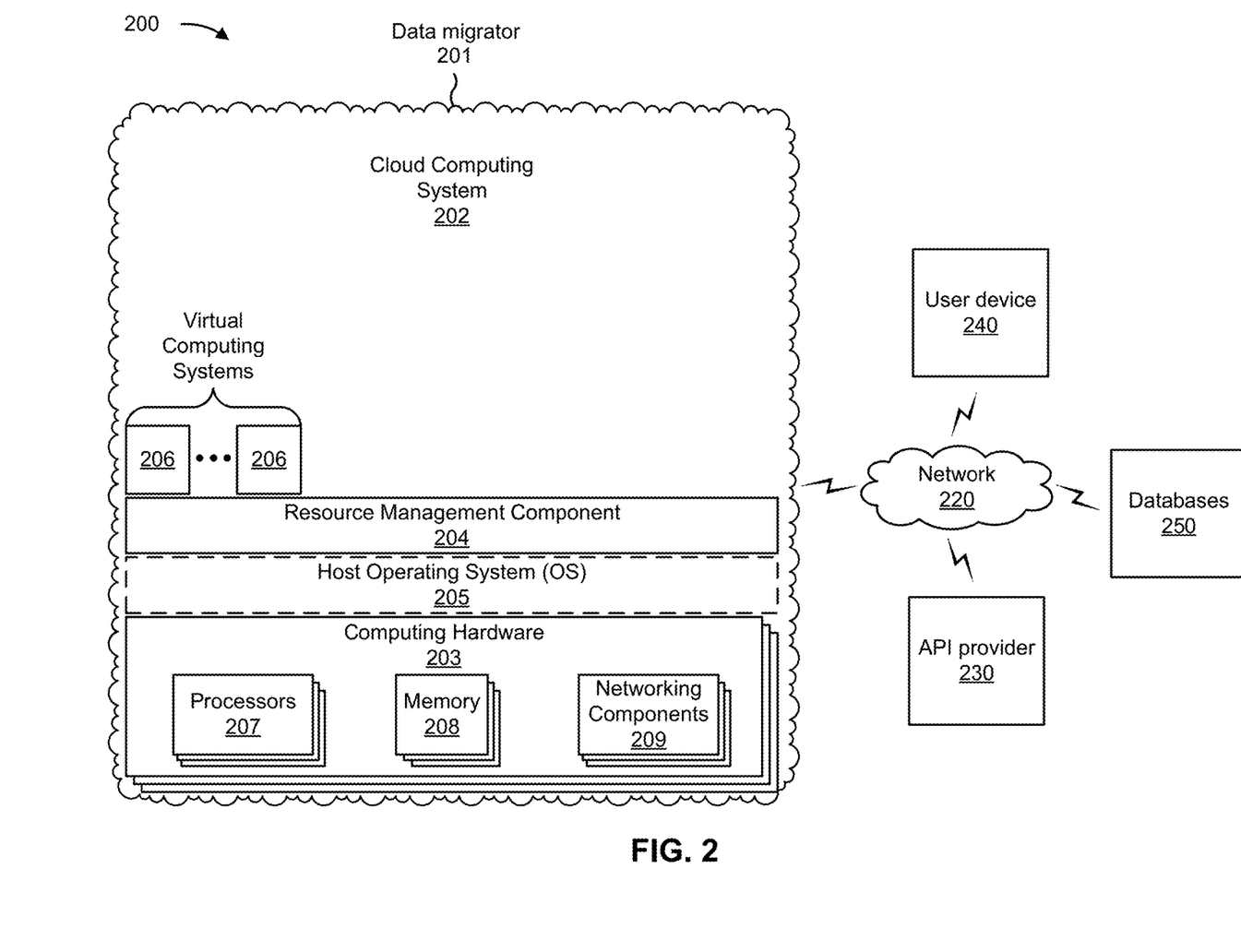
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a data migrator 201, which may include one or more elements of and/or may execute within a cloud computing system 202. The cloud computing system 202 may include one or more elements 203-209, as described in more detail below. As further shown in FIG. 2, environment 200 may include a network 220, an API provider 230, a user device 240, and/or databases 250. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines. Additionally, or alternatively, the resource management component 204 may include a container manager, such as when the virtual computing systems 206 are containers. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine, a container, or a hybrid environment that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the data migrator 201 may include one or more elements 203-209 of the cloud computing system 202, may execute within the cloud computing system 202, and/or may be hosted within the cloud computing system 202, in some implementations, the data migrator 201 may not be cloud-based (e.g., may be implemented outside of a cloud computing system) or may be partially cloud-based. For example, the data migrator 201 may include one or more devices that are not part of the cloud computing system 202, such as device 300 of FIG. 3, which may include a stand-alone server or another type of computing device. The data migrator 201 may perform one or more operations and/or processes described in more detail elsewhere herein.

Network 220 includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

The API provider 230 may include one or more devices capable of receiving, generating, storing, processing, providing, and/or routing information from the databases 250. The API provider 230 may include a communication device and/or a computing device. For example, the API provider 230 may include a server, such as an application server, a client server, a web server, a database server, a host server, a proxy server, a virtual server (e.g., executing on computing hardware), or a server in a cloud computing system. In some implementations, the API provider 230 may include computing hardware used in a cloud computing environment.

The user device 240 may include one or more devices capable of receiving, generating, storing, processing, and/or providing information associated with migration from a relational database to a non-relational database, as described elsewhere herein. The user device 240 may include a communication device and/or a computing device. For example, the user device 240 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The databases 250 may be implemented on one or more devices capable of receiving, generating, storing, processing, and/or providing information associated with at least a relational database and a non-relational database, as described elsewhere herein. The databases 250 may be implemented on communication devices and/or computing devices. For example, the databases 250 may be implemented on servers, database servers, application servers, client servers, web servers, host servers, proxy servers, virtual servers (e.g., executing on computing hardware), servers in a cloud computing system, devices that includes computing hardware used in a cloud computing environment, or similar types of devices.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
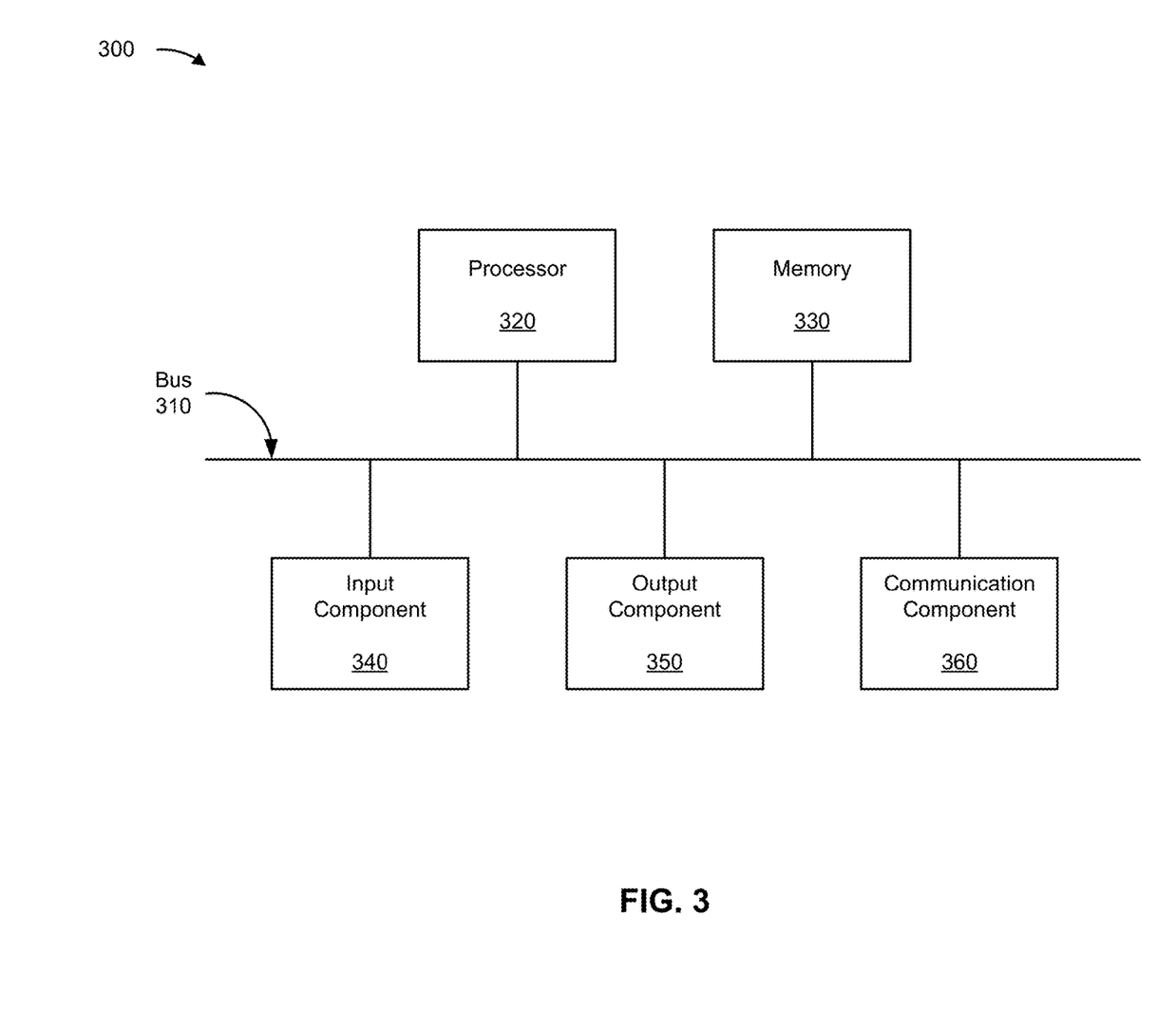
FIG. 3 is a diagram of example components of one or more devices of FIG. 2, in accordance with some embodiments of the present disclosure.

FIG. 3 is a diagram of example components of a device 300 associated with migration and validation of data from tabular structures to non-relational data stores. Device 300 may correspond to API provider 230, user device 240, and/or databases 250. In some implementations, API provider 230, user device 240, and/or databases 250 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
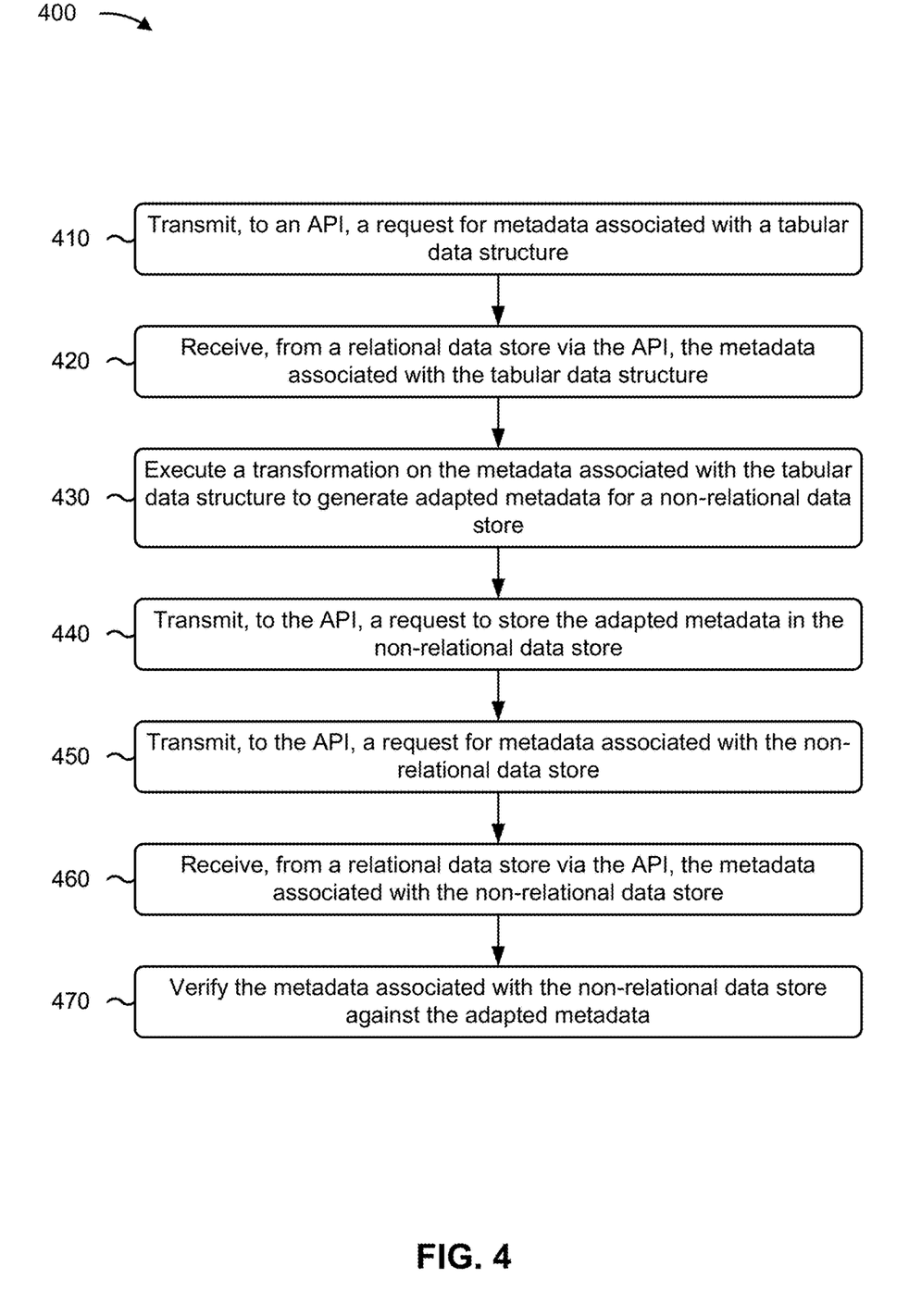
FIG. 4 is a flowchart of an example process relating to migration and validation of data from tabular structures to non-relational data stores, in accordance with some embodiments of the present disclosure.

FIG. 4 is a flowchart of an example process 400 associated with migration and validation of data from tabular structures to non-relational data stores. In some implementations, one or more process blocks of FIG. 4 may be performed by the data migrator 201. In some implementations, one or more process blocks of FIG. 4 may be performed by another device or a group of devices separate from or including the data migrator 201, such as the API provider 230, the user device 240, and/or the databases 250. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include transmitting, to an API, a request for metadata associated with a tabular data structure (block 410). For example, the data migrator 201 (e.g., using processor 320, memory 330, and/or communication component 360) may transmit, to an API, a request for metadata associated with a tabular data structure, as described above in connection with reference number 113 of FIG. 1B. As an example, the request may comprise a GET command (e.g., one or more GET commands). The request may include a wildcard or another type of arbitrary input that returns all items associated with the tabular data structure. In some implementations, the data migrator may receive a list of identifiers (e.g., asset IDs) such that the data migrator uses the list of identifiers to generate requests associated with the tabular data structure.

As further shown in FIG. 4, process 400 may include receiving, from a relational data store via the API, the metadata associated with the tabular data structure (block 420). For example, the data migrator 201 (e.g., using processor 320, memory 330, input component 340, and/or communication component 360) may receive, from a relational data store via the API, the metadata associated with the tabular data structure, as described above in connection with reference number 121 of FIG. 1B. As an example, the API provider may execute the request (e.g., the GET command) on the relational data store and may receive a response to the request from the relational data store. The response may include the metadata (e.g., one or more metadata items) associated with the tabular data structure.

As further shown in FIG. 4, process 400 may include executing a transformation on the metadata associated with the tabular data structure to generate adapted metadata for a non-relational data store (block 430). For example, the data migrator 201 (e.g., using processor 320 and/or memory 330) may execute a transformation on the metadata associated with the tabular data structure to generate adapted metadata for a non-relational data store, as described above in connection with reference number 123 of FIG. 1B. As an example, the data migrator may rename fields (e.g., one or more fields) in the metadata associated with the tabular data structure to generate adapted fields (e.g., one or more adapted fields) in the adapted metadata. Additionally, or alternatively, the data migrator may convert the metadata associated with the tabular data structure from a first format (e.g., an XML, format and/or another type of metadata format) to generate the adapted metadata in a second format (e.g., a JSON format and/or another type of metadata format).

As further shown in FIG. 4, process 400 may include transmitting, to the API, a request to store the adapted metadata in the non-relational data store (block 440). For example, the data migrator 201 (e.g., using processor 320, memory 330, and/or communication component 360) may transmit, to the API, a request to store the adapted metadata in the non-relational data store, as described above in connection with reference number 125 of FIG. 1C. As an example, the request may comprise a PUT command (e.g., one or more PUT commands). In some implementations, the data migrator may receive a list of identifiers (e.g., asset IDs) associated with the metadata such that the data migrator uses the list of identifiers to generate requests for corresponding adapted metadata to be stored in the non-relational data store.

As further shown in FIG. 4, process 400 may include transmitting, to the API, a request for metadata associated with the non-relational data store (block 450). For example, the data migrator 201 (e.g., using processor 320, memory 330, and/or communication component 360) may transmit, to the API, a request for metadata associated with the non-relational data store, as described above in connection with reference number 133 of FIG. 1D. As an example, the request may comprise a GET command (e.g., one or more GET commands). In some implementations, the data migrator may receive a list of identifiers (e.g., asset IDs) such that the data migrator uses the list of identifiers to generate requests for the non-relational data store.

As further shown in FIG. 4, process 400 may include receiving, from a relational data store via the API, the metadata associated with the non-relational data store (block 460). For example, the data migrator 201 (e.g., using processor 320, memory 330, input component 340, and/or communication component 360) may receive, from a relational data store via the API, the metadata associated with the non-relational data store, as described above in connection with reference number 139 of FIG. 1D. As an example, the API provider may execute the request (e.g., the GET command) on the non-relational data store and may receive a response to the request from the non-relational data store.

The response may include the metadata (e.g., one or more metadata items) associated with the non-relational data store.

As further shown in FIG. 4, process 400 may include verifying the metadata associated with the non-relational data store against the adapted metadata (block 470). For example, the data migrator 201 (e.g., using processor 320 and/or memory 330) may verify the metadata associated with the non-relational data store against the adapted metadata, as described above in connection with reference number 141 of FIG. 1D. As an example, the data migrator may verify that data included in each field of the adapted metadata matches data included in a corresponding field of the metadata associated with the non-relational data store.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:
one or more memories; and
one or more processors, coupled to the one or more memories, configured to:
receive a command to initiate transfer from a relational data store to a non-relational data store;
transmit, to an application programming interface (API) in communication with the relational data store and the non-relational data store, a request for metadata associated with a tabular data structure in the relational data store, wherein the command includes an override header indicating that the command is associated with the relational data store;
receive, from the relational data store via the API and based on transmitting the request for the metadata, an asset identifier associated with a metadata item;
initiate, based on receiving the asset identifier, a state machine, associated with migration of the relational data store to the non-relational data store, comprising a plurality of processing threads and a plurality of states, wherein the metadata item is associated with a particular processing thread of the plurality of processing threads and a corresponding state of the plurality of states;
execute, according to the particular processing thread, to advance the state of the metadata item, a transformation on the metadata to generate, based on the metadata, adapted metadata for the non-relational data store,
wherein the transformation on the metadata is executed by converting the metadata from a first format to a second format;
transmit, to the API and according to the particular processing thread to advance the state of the metadata item, a request for storing the adapted metadata in the non-relational data store;
transmit, to the API and according to the particular processing thread to advance the state of the metadata item, a request for particular metadata associated with the non-relational data store;

receive, from the non-relational data store via the API and based on the request for the particular metadata, the particular metadata;

verify, according to the particular processing thread to advance the state of the metadata item, the particular metadata against the adapted metadata by verifying that data included in each field of the adapted metadata matches data is included in a corresponding field of the particular metadata;

determine, based on verifying the particular metadata against the adapted metadata, that there is an error with specific metadata of the particular metadata;

execute, based on determining that there is the error with the specific metadata and by converting the specific metadata from the first format to the second format, a transformation on the specific metadata to generate specific adapted metadata for the non-relational data store; and transmit, to the API, a request for storing the specific adapted metadata in the non-relational data store.

2. The system of claim 1, wherein the one or more processors are further configured to:
generate the override header for the request for the metadata.

3. The system of claim 1, wherein the one or more processors are further configured to:
generate an override header for the request for storing the adapted metadata in the non-relational data store.

4. The system of claim 1, wherein the one or more processors, to execute the transformation, are configured to:
rename one or more fields in the metadata to generate one or more adapted fields in the adapted metadata.

5. The system of claim 1, wherein the first format is an extensible markup language format, and the second format is a JavaScript object notation format.

6. The system of claim 1, wherein the command for the metadata includes an arbitrary input that returns all of the metadata from the tabular data structure.

7. A method, comprising:
receiving, from a user device, a command to initiate a transfer from a relational database to a non-relational database;

querying, the relational database and via an application program interface (API) in communication with the relational database and the non-relational database, the relational database for a plurality of metadata items associated with a tabular structure of the relational database;

initiating a state machine comprising a plurality of processing threads and a plurality of states, wherein each metadata item, of the plurality of metadata items, is associated with a different processing threshold of the plurality of processing threads, and a different state of the plurality of states;

for each metadata item, of the plurality of metadata items, and according to a respective processing thread, of the plurality of processing threads, and a respective state of the plurality of states:
generating an adapted metadata item based on a respective metadata item of the plurality of metadata items;
transmitting, to the API, a request for an additional metadata item from the non-relational database;
receiving, from the relational database via the API, the additional metadata item;
verifying the adapted metadata item against the additional metadata item by verifying that data included in each field of the adapted metadata item matches data included in a corresponding field of the additional metadata item;

determining, based on verifying the adapted metadata item against the additional metadata item, that there is an error with specific metadata of the metadata item;

executing, based on determining that there is the error with the specific metadata and by converting the specific metadata from a first format to a second format, a transformation on the specific metadata to generate a specific adapted metadata item for a non-relational database; and transmitting, to the API, a request for storing the specific adapted metadata item in the non-relational database.

8. The method of claim 7, further comprising:
updating the state machine after each specific adapted metadata item is transmitted.

9. The method of claim 7, wherein each metadata item is associated with a tabular data structure in the relational database.

10. The method of claim 7, wherein each adapted metadata item is associated with a document in the non-relational database.

11. The method of claim 7, wherein executing the transformation further comprises:
renaming one or more fields in the respective metadata item to generate one or more adapted fields in the adapted metadata item.

12. The method of claim 7, wherein the first format is an extensible markup language format, and the second format is a JavaScript object notation format.

13. A non-transitory computer-readable medium storing a set of instructions comprising:
one or more instructions that, when executed by one or more processors of a device, cause the device to:
initiate a state machine comprising a plurality of processing threads and a plurality of states;
query a relational data store for a plurality of metadata items, wherein each metadata item, of the plurality of metadata items, is associated with a particular processing threshold of the plurality of processing threads, and a particular state of the plurality of states; and
for each metadata item, of the plurality of metadata items, and according to a respective processing threshold, of the plurality of processing threads, and a respective state, of the plurality of states and corresponding to the metadata item:
generate an adapted metadata item based on a respective metadata item of the plurality of metadata items;
transmit, to an application programming interface (API), a request for an additional metadata item from a non-relational data store;
receive, from the relational data store via the API, the additional metadata item;
verify the adapted metadata item against the additional metadata item by verifying that data included in each field of the adapted metadata item matches data is included in a corresponding field of the additional metadata item;
determine, based on verifying the adapted metadata item against the additional metadata item, that there is an error with specific metadata of the metadata item;

execute, based on determining that there is the error with the specific metadata and by converting the specific metadata from a first format to a second format, a transformation on the specific metadata to generate a specific adapted metadata item for the non-relational data store;

transmit, to the API, a request for storing the specific adapted metadata item in the non-relational data store;

transmit, to the API and based on, a request for a particular metadata item associated with the non-relational data store,
  wherein the request for the particular metadata item includes a particular asset identifier;

receive, from the non-relational data store via the API, a copy of the particular metadata item; and validate the copy of the particular metadata item against the adapted metadata item by verifying that data included in each field of the adapted metadata item is included in a corresponding field of the copy of the particular metadata item.

14. The non-transitory computer-readable medium of claim 13, wherein the relational data store comprises one or more tabular data structures.

15. The non-transitory computer-readable medium of claim 13, wherein the non-relational data store comprises a plurality of documents.

16. The non-transitory computer-readable medium of claim 13, wherein the one or more instructions, when executed by the one or more processors, further cause the device to:
  receive a plurality of asset identifiers based on querying the relational data store,
  wherein particular asset identifier are included in the plurality of asset identifiers.

17. The non-transitory computer-readable medium of claim 13, wherein the one or more instructions, when executed by the one or more processors, further cause the device to:
  receive a command, from a user device associated with the relational data store, to initiate transfer from the relational data store to the non-relational data store.

18. The non-transitory computer-readable medium of claim 13, wherein the one or more instructions, when executed by the one or more processors, further cause the device to:
  transmit a confirmation to a user device associated with the relational data store.

19. The non-transitory computer-readable medium of claim 13, wherein the one or more instructions, that cause the device to execute the transformation, further cause the device to:
  rename one or more fields in the respective metadata item to generate one or more adapted fields in the specific adapted metadata item.

20. The non-transitory computer-readable medium of claim 13, wherein the first format is an extensible markup language format, and the second format is a JavaScript object notation format.

* * * * *